UNITED STATES PATENT OFFICE.

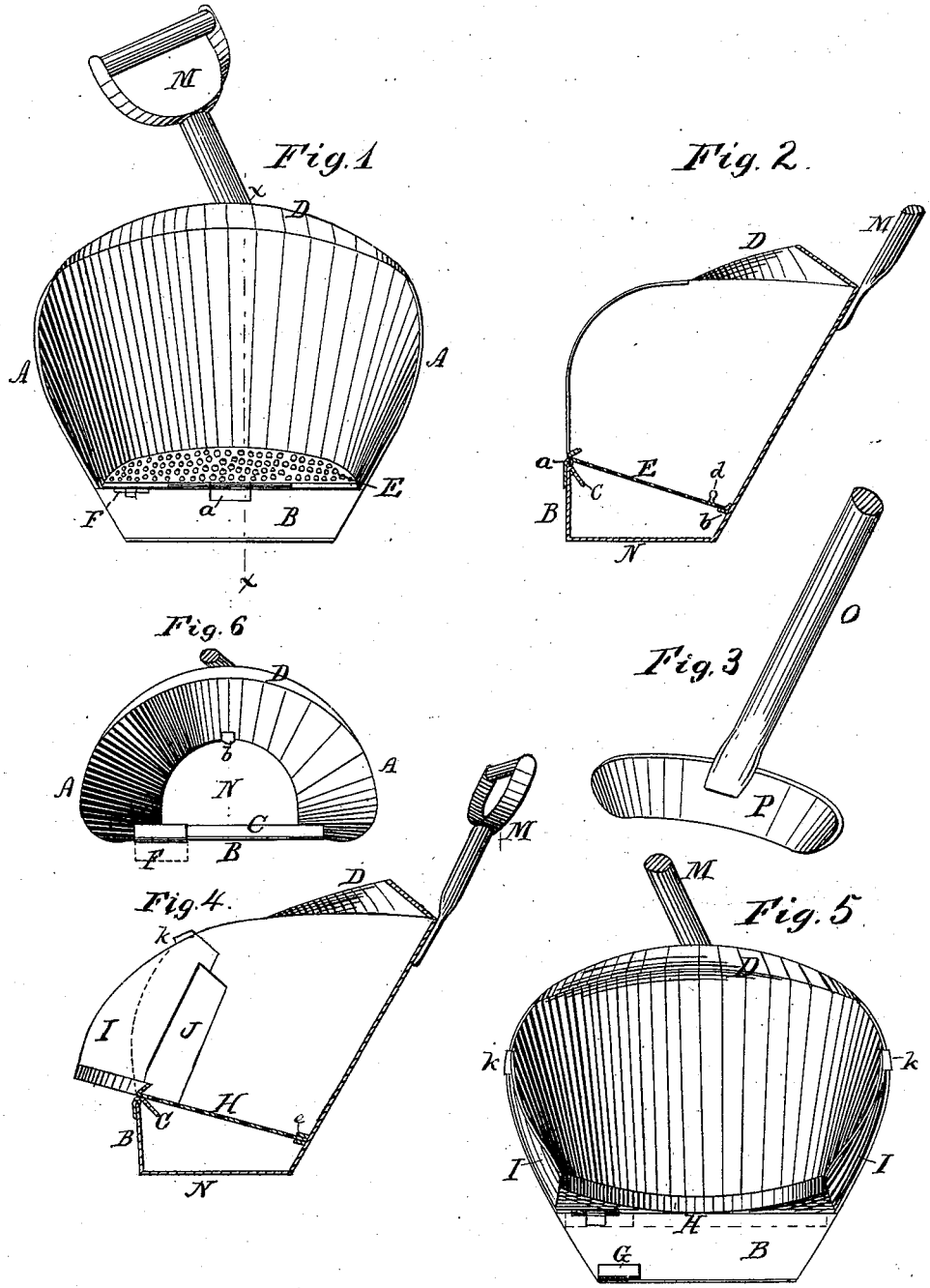

JOHN F. CORBIN AND MYRON W. MOSELEY, OF EAGLE BRIDGE, NEW YORK.

IMPROVEMENT IN POTATO-BUG CATCHERS.

Specification forming part of Letters Patent No. 194,862, dated September 4, 1877; application filed July 20, 1877.

*To all whom it may concern:*

Be it known that we, J. F. CORBIN and M. W. MOSELEY, of Eagle Bridge, in the county of Rensselaer and State of New York, have invented certain new and useful Improvements in Potato-Bug Catchers; and we do hereby declare that the following is a full and exact description thereof, reference being had to the accompanying drawings, making a part of this specification.

Our invention relates to certain new and useful improvements in devices for catching potato-bugs.

It has for its object simplicity and economy in construction, and ready adaptability to the uses for which it is intended.

With these objects in view our invention consists of a receptacle or scoop formed of sheet metal, with guards to prevent the escape of the captured bugs, and accompanied with a ladle for knocking the bugs from the vines, all as will be hereinafter more fully set forth.

To enable others to make and use our invention, we will proceed to describe the same, referring by letters to the accompanying drawings, in which—

Figure 1 is a front view of a scoop embodying our invention, and inclined as it would be when depending from the hand when moving from one vine or place to another. Fig. 2 is a central vertical section at the line $x\,x$ of Fig. 1. Fig. 3 is a perspective view of the ladle to be used in connection with the scoop for knocking the bugs into the same. Fig. 4 is a view similar to Fig. 2, and showing a modification in the construction and mode of attachment of the perforated bottom. Fig. 5 is a similar view to Fig. 1, except that the scoop is shown with the modified bottom illustrated in Fig. 4, and in the position it would assume when firmly grasped while the bugs are being forced into the same by the ladle. Fig. 6 is a top view, on decreased scale, with the perforated bottom removed, and showing the hinged door through which the bugs are allowed to escape when desired.

The scoop is formed with flaring sides A, and a shallow front, B, the top edge of which is bent inwardly and downwardly, forming an inclined guard, C, which prevents the bugs from crawling upwardly at that point.

D is a crescent-shaped guard, arranged at the back edge, where the handle is secured, and prevents the escape of bugs at that point when the instrument is elevated to receive bugs from tall vines, at which time the back temporarily becomes the bottom, the bugs rolling down upon the perforated bottom as soon as the instrument is lowered and held in either of the positions shown in the drawings.

E is a perforated bottom (see Figs. 1 and 2) hinged at the front, as seen at $a$, and inclining toward the back, and supported at that point by a suitable stop, $b$. This bottom is provided with a knob, $d$, for swinging it upon its hinge $a$. The front edge of the bottom E is turned up, and inclined to arrest the escape of bugs, as clearly seen at Fig. 2.

F, Figs. 1 and 6, is a door or opening in the flange or incline C, hinged as seen, and adapted to open, as shown in dotted lines, to allow the bugs to be poured out when they are to be destroyed, or closed, as shown in solid lines, to prevent escape. A similar door may be arranged at the bottom corner in lieu of the one in the flange, as shown at G, Fig. 5.

Instead of the hinged bottom E shown at Figs. 1 and 2, we may employ the removable bottom H shown at Figs. 4 and 5. This bottom is formed with two ears, 1, at the front edge or ends of its sides, adapted to slide in between the sides of the scoop, and two pieces, J, secured thereto, so as to form a groove. The top ends of the ears I are provided with two overlapping hooks, $k$, to aid in securing the bottom in place. The back edge of this bottom H is secured between a split lug, $e$.

The quadrilateral space under the perforated bottom, it will be observed, is deeper in front, and when the instrument is held loosely in the hand the relation of the handle and scoop is such that the front edge will gravitate, and the bugs will roll down to the front or deepest edge of the quadrilateral.

The instrument is used in the following manner: The handle M is grasped in the left hand, and the scoop is thus held with its bottom about horizontal. (See Figs. 2 and 4.) It is placed under the vine infested with bugs, and the ladle, (seen at Fig. 3,) which is composed of a light wood handle, O, and sheet-metal scraper P, suitably curved, is grasped in the right hand and passed over the vine. The shapes of the scoop and ladle are such, relatively to each other, that in passing the ladle over the vine its branches are concentrated within the scoop, and the bugs scraped into the same. The inclined sides of the scoop direct them onto the perforated bottom, and in their struggles to escape they drop through the holes and into the scoop-bottom N. The space between the perforated bottom and the scoop-bottom is sufficient to prevent the bugs from again reaching the perforated bottom, and the holes are sufficiently far from the edge to prevent the bugs from reaching the same by climbing the sides of the scoop.

The flange C prevents the escape when the perforated bottom is removed previous to discharging the bugs through the hinged door F, and the instrument may be used without the perforated bottom, though we prefer to use it, as affording greater security against the escape of the bugs or accidental discharge of the same when the position of the scoop is changed in gathering bugs from tall vines.

Of course, the use of our bug-catcher is not limited to potato-bugs, but may be used with success in capturing other bugs from other and taller vines.

What we claim as our invention, and desire to secure by Letters Patent, is—

1. The sheet-metal scoop formed with flaring sides A, front B with its forwardly-inclined flange C, and handle M, arranged to tilt the scoop in the manner and for the purposes described.

2. In combination with the scoop formed as described, the perforated bottom E or H, arranged in an inclined position, to form an enlarged space underneath and at the front, substantially as and for the purposes described.

3. The front B, provided with flange C, and having door F formed in said flange, substantially as and for the purposes set forth.

4. The ladle formed of wood and sheet metal, and shaped, as described, with reference to the scoop, to concentrate the vines, substantially as described.

Witness our hands and seals this 13th day of July, 1877.

JOHN F. CORBIN. [L. S.]
M. W. MOSELEY. [L. S.]

Witnesses:
T. E. HOLTON,
H. P. BURTIS.